United States Patent
Nakhjavani (10) Patent No.: US 10,343,784 B2
(45) Date of Patent: Jul. 9, 2019

(54) METHODS FOR OPTIMIZED ENGINE BALANCING BASED ON FLIGHT DATA

(71) Applicant: The Boeing Company, Chicago, IL (US)

(72) Inventor: Omid B. Nakhjavani, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 15/616,589

(22) Filed: Jun. 7, 2017

(65) Prior Publication Data
US 2018/0354630 A1 Dec. 13, 2018

(51) Int. Cl.
| | |
|---|---|
| *B64D 27/16* | (2006.01) |
| *B64D 45/00* | (2006.01) |
| *B64F 5/60* | (2017.01) |
| *G06N 3/08* | (2006.01) |
| *F01D 5/02* | (2006.01) |
| *F04D 29/66* | (2006.01) |
| *F01D 17/02* | (2006.01) |
| *G01M 1/36* | (2006.01) |
| *F04D 29/32* | (2006.01) |

(52) U.S. Cl.
CPC .............. *B64D 27/16* (2013.01); *B64D 45/00* (2013.01); *B64F 5/60* (2017.01); *F01D 5/027* (2013.01); *F01D 17/02* (2013.01); *F04D 29/321* (2013.01); *F04D 29/662* (2013.01); *G01M 1/36* (2013.01); *G06N 3/08* (2013.01); *B64D 2045/0085* (2013.01); *F05D 2220/323* (2013.01); *F05D 2260/81* (2013.01); *F05D 2260/821* (2013.01); *F05D 2270/709* (2013.01)

(58) Field of Classification Search
CPC .................................. B64D 27/16; B64F 5/60
See application file for complete search history.

(56) References Cited

U.S. PATENT DOCUMENTS

| | | | |
|---|---|---|---|
| 4,098,127 A | 7/1978 | Shiga et al. | |
| 4,485,678 A | 12/1984 | Fanuele | |
| 5,172,325 A | 12/1992 | Heidari | |
| 5,586,065 A | 12/1996 | Travis | |
| 6,027,239 A * | 2/2000 | Ghassaei | G01H 1/003 244/1 N |

(Continued)

*Primary Examiner* — Alex C Dunn
(74) *Attorney, Agent, or Firm* — Ostrager Chong Flaherty & Broitman P.C.

(57) ABSTRACT

Methods for balancing aircraft turbofan engines using an artificial neural network and a global optimization algorithm, which are configured as a loop in which: the global optimization algorithm inputs to the artificial neural network data representing proposed changes in the balance weight attached to the engine; the artificial neural network outputs data estimating changes in engine vibration in response to input of the data representing the proposed changes in balance weight; and the global optimization algorithm outputs an optimum influence coefficient calculated using a minimum predicted change in engine vibration. This process can be repeated multiple times to derive a multiplicity of optimum influence coefficients which are used to determine an optimal balance solution for the engine. The balance weights attached to the engine are then reconfigured in accordance with the optimal balance solution.

14 Claims, 5 Drawing Sheets

(56) References Cited

U.S. PATENT DOCUMENTS

| | | | |
|---|---|---|---|
| 6,493,689 B2* | 12/2002 | Kotoulas | F16F 15/02 706/23 |
| 6,711,952 B2 | 3/2004 | Leamy et al. | |
| 7,243,023 B2 | 7/2007 | Skilton | |
| 7,321,809 B2 | 1/2008 | Vian et al. | |
| 7,363,111 B2* | 4/2008 | Vian | G05B 23/024 700/279 |
| 7,371,042 B2 | 5/2008 | Lee | |
| 7,400,943 B2* | 7/2008 | Vian | G05B 23/024 700/279 |
| 7,478,013 B2* | 1/2009 | Harrison | G05B 23/024 702/183 |
| 8,313,279 B2 | 11/2012 | Mollmann | |
| 9,347,321 B2 | 5/2016 | Heidari et al. | |
| 9,587,512 B1 | 3/2017 | Skilton et al. | |
| 2002/0117579 A1* | 8/2002 | Kotoulas | F16F 15/02 244/1 N |
| 2005/0149234 A1* | 7/2005 | Vian | G05B 23/024 700/279 |
| 2006/0251507 A1* | 11/2006 | Braswell | F01D 5/027 415/13 |
| 2007/0227246 A1* | 10/2007 | Vian | G05B 23/024 73/462 |
| 2013/0149130 A1 | 6/2013 | Hasting et al. | |
| 2015/0106313 A1* | 4/2015 | Eklund | G06N 3/02 706/21 |
| 2016/0032725 A1* | 2/2016 | Heidari | G01M 1/22 701/33.1 |
| 2018/0268288 A1* | 9/2018 | Vandike | G06N 3/08 |

* cited by examiner

METHODS FOR OPTIMIZED ENGINE BALANCING BASED ON FLIGHT DATA

BACKGROUND

This disclosure generally relates to systems and methods for balancing rotating machinery to reduce or minimize vibrations. In particular, the disclosed embodiments relate to systems and methods for balancing gas turbine aircraft engines.

It is either impossible or nearly impossible, as a practical matter, to build a rotating structure that is perfectly balanced upon manufacture. Any such structure will produce a certain amount of undesired vibration to a greater or lesser extent. Such vibration is usually passed through bearings that support the rotating part of the structure, and can therefore manifest itself as unwanted noise or vibration in adjacent structures. As is known to those skilled in the art, synchronous vibration may be characterized by an amplitude (i.e., magnitude) and a phase angle (i.e., direction). Thus, the vibration of a part may be represented as a vector or phasor.

One type of rotating machinery susceptible to undesired vibration is the high-bypass turbofan engine used in commercial aviation. Such engines have a large number of rotating elements. These rotating elements can be grouped according to the relative speed of rotation. Some of the rotating elements form a low-speed rotating system and other rotating elements form one or more high-speed rotating systems. More specifically, each rotating system of a gas turbine engine comprises an upstream rotating multi-stage compressor connected to a downstream multi-stage turbine by means of a shaft. The low-pressure turbine and low-pressure compressor are connected by a low-pressure shaft; the high-pressure turbine and high-pressure compressor are connected by a high-pressure shaft which surrounds a portion of the low-pressure shaft, with the high-pressure compressor and turbine being disposed between the low-pressure compressor and turbine. The fan of the turbofan engine is the first stage of the low-pressure compressor. Vibration caused by unbalances in the various stages of a turbofan engine contributes to wear and fatigue in engine components and surrounding structures, and unwanted noise in the passenger cabin of the airplane.

One way of reducing structurally transmitted vibrations is to balance the rotating systems of aircraft engines on an individual basis. Engine balancing is well known in the aircraft art. The manufacturers of turbofan engines have developed techniques for controlling the magnitude of unwanted vibration by affixing balancing mass to the engine. Typically, the fan and the last stage of the low-pressure turbine of a turbofan engine are the only accessible locations for applying balancing mass after the engine is manufactured or assembled. Internal stages are inaccessible as a practical matter.

A known method for applying balancing mass involves the selection of a combination of balancing screws from a set of screws of different standard mass, with screws being threadably inserted into respective threaded holes located around an outer periphery of an internal turbofan engine component (such as a fan spinner). For example, to achieve a balance, one or more screws of the same mass or different masses can be screwed into respective threaded holes, thereby producing a center of gravity which is closer to the axis of rotation than was the case without balancing. The total effect of multiple attached balancing masses can be determined by treating each mass and its respective location as a vector, originating at the axis of rotation, and performing a vector sum.

The specification of the location (i.e., including both distance from the axis of rotation and phase angle) and amount of mass to be applied to a rotating system in order to balance it is referred to herein as the balance solution for the rotating system. In order to determine balance solutions for rotating systems of turbofan engines, vibration data is obtained. Vibration data is a measure of the amount of vibration that an engine is producing at various locations as the engine is operated at various speeds and through ranges of other parameters (such as altitude). Vibration data can be gathered at an engine balancing facility located on the ground or during flight. If accelerometers are used to capture rotating system vibration response, synchronous vibration data may be derived using a keyphasor index on the rotating system. While multiple methods known to the art can be used to capture and derive vibration data, that data should contain a displacement as well as a phase corresponding to synchronous vibration. After vibration data is obtained, the vibration data, measured at accelerometers, and the sensitivity of the accelerometers to unit weights applied at the balance locations are used to derive a balance solution that attempts to minimize the vibration of the engine producing the data.

Jet engines generate vibratory loads due to inherent imbalance on each stage of the rotating shafts which transfer through bearings to propulsion stationary structures and are transmitted through wing structures to emerge as cabin noise and vibration. Airframe manufacturers seek to keep cabin noise and vibration at low levels to ensure passenger and crew ride comfort. Typically, airframe and engine manufacturers agree on the level of engine vibration limits measured during engine runs on a test cell at two sensors before shipment to the airframe manufacturer for installation on an airplane. Normally, engine vibrations during airplane ground runs are close to the levels measured on a test cell. However, engine vibrations during flight can be much higher than ground-run levels, causing excessive cabin noise and vibration. Higher engine vibrations during flight may be caused by extra fan imbalance due to fan blade movement during flight, especially for a new generation of engines with wide-chord fan blades. As a result, subsequent flight tests may be needed and engine balancing may be performed after each one until acceptable cabin noise and vibration levels are obtained. Each flight test costs significant time and money to conduct.

It would be beneficial to provide a balancing approach which minimizes the number of flight tests and balancing operations resulting from the foregoing issues.

SUMMARY

The subject matter disclosed in some detail below is directed to a method for balancing aircraft turbofan engines having dynamic unbalance characteristics to minimize vibrations, which method uses an artificial neural network and a global optimization algorithm. Both the artificial neural network and the global optimization algorithm may be implemented as computer code representing instructions to be executed (which computer code is stored in a non-transitory tangible computer-readable storage medium). More specifically, the artificial neural network and global optimization algorithm are configured as a loop in which: the global optimization algorithm inputs to the artificial neural network data representing proposed changes in the balance weight attached to the engine; the artificial neural network outputs data estimating changes in engine vibration in response to input of the data representing the proposed changes in balance weight; and the global optimization algorithm outputs an optimum influence coefficient calculated using a minimum predicted change in engine vibration. This process can be repeated multiple times to derive a multiplicity of optimum influence coefficients for various ranges of shaft speed measured in revolutions per minute (hereinafter "engine rpm") and altitude, which optimum influence coefficients are used to determine an optimal balance solution for the engine. The balance weights attached to the engine are then reconfigured in accordance with the optimal balance solution.

A difference between two vibrations (amplitude and phase) at a sensor attached to an aircraft engine during two different flights of the aircraft will be referred to herein as "delta vibration" (hereinafter "$\Delta$ vibration"). Similarly, a difference between two balance weights (magnitude and phase angle) attached to an aircraft engine during two different flights of the aircraft will be referred to herein as "delta balance weight" (hereinafter "$\Delta$ balance weight"). The artificial neural network disclosed herein is trained to output $\Delta$ vibration data representing a predicted $\Delta$ vibration for an engine in response to input of flight parameter data for first and second flights of the aircraft and $\Delta$ balance weight data representing a $\Delta$ balance weight.

Although various embodiments of systems and methods for balancing an aircraft turbofan engine will be described in some detail below, one or more of those embodiments may be characterized by one or more of the following aspects.

One aspect of the subject matter disclosed in detail below is a method for balancing a gas turbine aircraft engine, comprising: (a) acquiring flight parameter data, balance weight data and vibration data for a multiplicity of flights of an aircraft having an engine; (b) using the flight parameter data, balance weight data and vibration data to train an artificial neural network to output $\Delta$ vibration data representing a predicted $\Delta$ vibration for an engine in response to input of flight parameter data for first and second flights of the aircraft and $\Delta$ balance weight data representing a $\Delta$ balance weight, wherein the predicted $\Delta$ vibration corresponds to the difference between the predicted engine vibration for the second flight and the measured engine vibration for the first flight, while the $\Delta$ balance weight corresponds to the difference between the respective balance weights for the first and second flights; (c) iteratively performing a loop of operations comprising using the artificial neural network and a global optimization method to calculate a first optimum influence coefficient, wherein the global optimization method determines a first minimum predicted $\Delta$ vibration output by the artificial neural network for modeled flights having various changed $\Delta$ balance weights, wherein the first minimum predicted $\Delta$ vibration is for engine rpm in a first engine rpm range and for altitudes in a first altitude range; (d) determining an optimal balance solution for the engine using the first optimum influence coefficient calculated in step (c); and (e) attaching to or removing from the engine one or more balance weights each having a respective mass and a respective location in accordance with the optimal balance solution. This method may further comprise: (f) calculating a second optimum influence coefficient using the artificial neural network and the global optimization method, wherein the global optimization method determines a second minimum predicted $\Delta$ vibration output by the artificial neural network for modeled flights having various changed $\Delta$ balance weights, wherein the second minimum predicted $\Delta$ vibration is for engine rpm in a second engine rpm range different than the first engine rpm range and for altitudes in the first altitude range or for engine rpm in the first engine rpm range and for altitudes in a second altitude range different than the first altitude range, wherein step (d) also uses the second optimum influence coefficient calculated in step (f) to determine the optimal balance solution.

In accordance with one embodiment, the artificial neural network is trained to output $\Delta$ vibration data representing a difference in amplitude and a difference in phase of predicted vibrations in the engine during the first and second flights of the aircraft in response to input of flight parameter data and $\Delta$ balance weight data for the first and second flights of the aircraft. In one example, the flight parameter data comprises data representing engine rpm, altitude, Mach number, temperature and thrust for the first and second flights, while the $\Delta$ balance weight data represents real and imaginary components of the $\Delta$ balance weight for the first and second flights. In addition, the global optimization method comprises: inputting to the artificial neural network $\Delta$ balance weight data representing various changed $\Delta$ balance weights; and determining the first minimum predicted $\Delta$ vibration in the engine based on the $\Delta$ vibration data that is output from the artificial neural network in response to input to the artificial neural network of the $\Delta$ balance weight data representing various changed $\Delta$ balance weights.

Another aspect of the subject matter disclosed in detail below is a method for balancing a gas turbine aircraft engine, comprising: (a) acquiring flight parameter data, balance weight data and vibration data for a multiplicity of flights of an aircraft having an engine; (b) using the flight parameter data, balance weight data and vibration data to train an artificial neural network to output $\Delta$ vibration data representing a predicted $\Delta$ vibration for an engine in response to input of flight parameter data for first and second flights and $\Delta$ balance weight data representing a $\Delta$ balance weight, wherein the predicted $\Delta$ vibration corresponds to the difference between the predicted engine vibration for the second flight and the measured engine vibration for the first flight, while the $\Delta$ balance weight corresponds to the difference between the respective balance weights for the first and second flights; (c) iteratively performing a loop of operations comprising using the artificial neural network and a global optimization method to calculate a first optimum influence coefficient, wherein the global optimization method determines a first minimum predicted $\Delta$ vibration output by the artificial neural network for modeled flights having various changed $\Delta$ balance weights, wherein the first minimum predicted $\Delta$ vibration is for engine rpm in a first engine rpm range and for altitudes in a first altitude range; (d) calculating a second optimum influence coefficient using the artificial neural network and the global optimization method, wherein the global optimization method determines a second minimum predicted $\Delta$ vibration output by the artificial neural network for modeled flights having various changed $\Delta$ balance weights, wherein the second minimum predicted $\Delta$ vibration is for engine rpm in a second engine rpm range different than the first engine rpm range and for altitudes in the first altitude range; (e) calculating a third optimum influence coefficient using the artificial neural network and the global optimization method, wherein the global optimization method determines a third minimum predicted $\Delta$ vibration output by the artificial neural network for modeled flights having various changed $\Delta$ balance weights, wherein the third minimum predicted $\Delta$ vibration is for engine rpm in the first engine rpm range and for altitudes in a second altitude range different than the first altitude range; (f) determining an optimal balance solution for the engine using the first, second and third optimum influence coefficients calculated in steps (c) through (e); and (g) attaching to or removing from the engine one or more balance weights each having a respective mass and a respective location in accordance with the optimal balance solution.

A further aspect of the subject matter disclosed in detail below is a gas turbine aircraft engine comprising a fan spinner and one or more balance weights attached to the fan spinner, wherein the mass and location of each balance weight was determined using a method comprising the following steps: (a) acquiring flight parameter data, balance weight data and vibration data for a multiplicity of flights of an aircraft to which the gas turbine aircraft engine is mounted; (b) using the flight parameter data, balance weight data and vibration data to train an artificial neural network to output Δ vibration data representing a predicted Δ vibration for the gas turbine aircraft engine in response to input of flight parameter data for first and second flights of the aircraft and Δ balance weight data representing a Δ balance weight, wherein the predicted Δ vibration corresponds to the difference between the predicted engine vibration for the second flight and the measured engine vibration for the first flight, while the Δ balance weight corresponds to the difference between the respective balance weights for the first and second flights; (c) iteratively performing a loop of operations comprising using the artificial neural network and a global optimization method to calculate a first optimum influence coefficient, wherein the global optimization method determines a minimum predicted Δ vibration output by the artificial neural network for modeled flights having various changed Δ balance weights, wherein the minimum predicted Δ vibration is for engine rpm in an engine rpm range and for altitudes in an altitude range; (d) determining an optimal balance solution for the engine using the optimum influence coefficient calculated in step (c), wherein the optimal balance solution specifies the respective mass and respective location of each balance weight.

Other aspects of engine balancing methods are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for balancing gas turbine aircraft engines now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
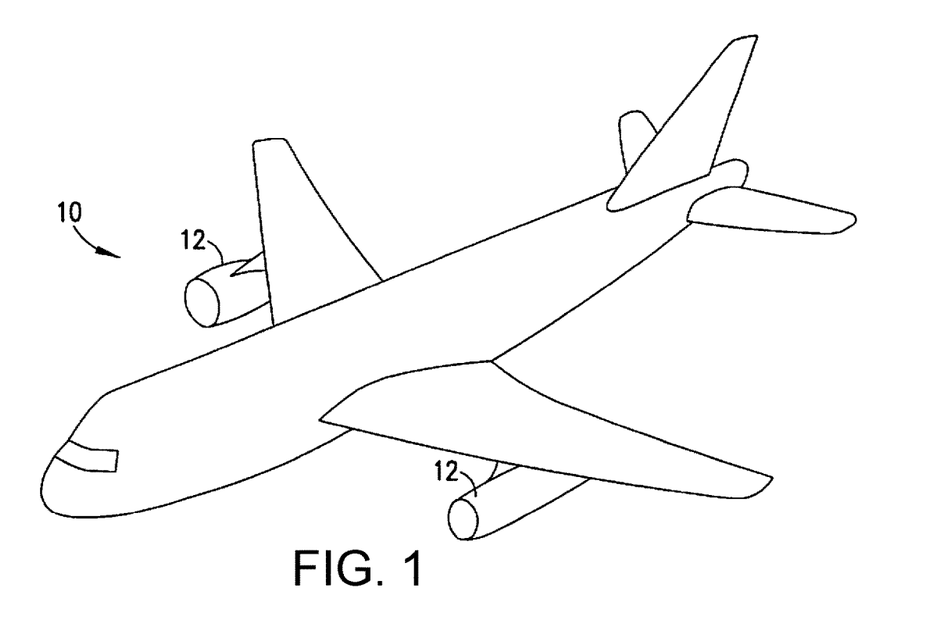
FIG. 1 is a diagram showing a perspective view of one example of an aircraft having gas turbine engines.
Figure 2:
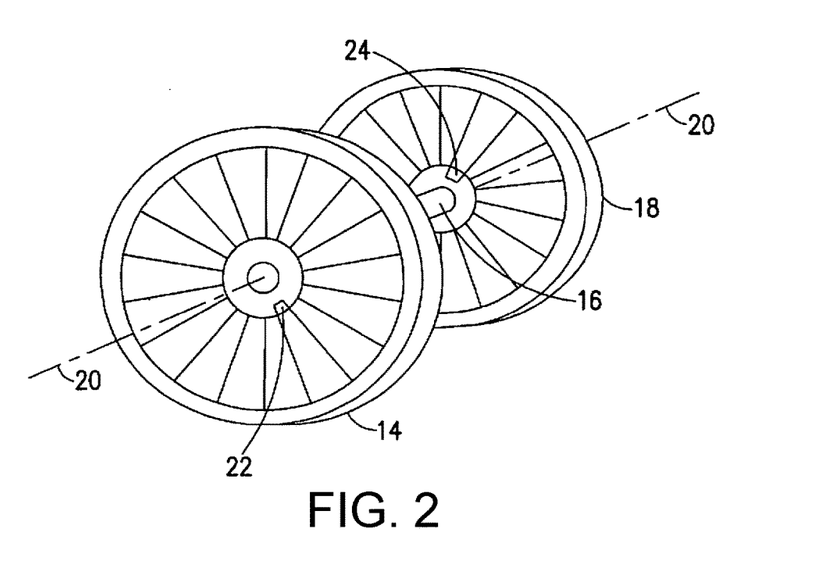
FIG. 2 is a diagram showing a perspective view of idealized rotating components of a turbojet engine.

FIG. 1 shows an aircraft 10 having a pair of gas turbine engines 12. Although the engines may be turbojet engines or turbofan engines, FIG. 2 is an idealized depiction of some rotating components of a turbojet engine. In particular, FIG. 2 shows a compressor rotor 14, a shaft 16, and a turbine rotor 18, both rotors being mounted on the shaft 16. This is just one example of a type of rotating machinery which can be balanced using the methodology disclosed hereinafter.

Due to many factors, such as manufacturing and assembly tolerances, distortion over time, and/or wear, it is unlikely that the center of mass of the compressor rotor 14 and/or turbine rotor 18 will perfectly match a geometric axis of rotation 20 of the assembly. Therefore, an attachment point 22 may be included on compressor rotor 14 and/or an attachment point 24 may be included on turbine rotor 18. Balancing masses may be added at the attachment points to balance the assembly about its axis of rotation 20. A balancing mass is intended to alter the center of mass of the rotating assembly to better align or coincide with the axis of rotation 20, thereby reducing if not minimizing vibrations.

Figure 3:
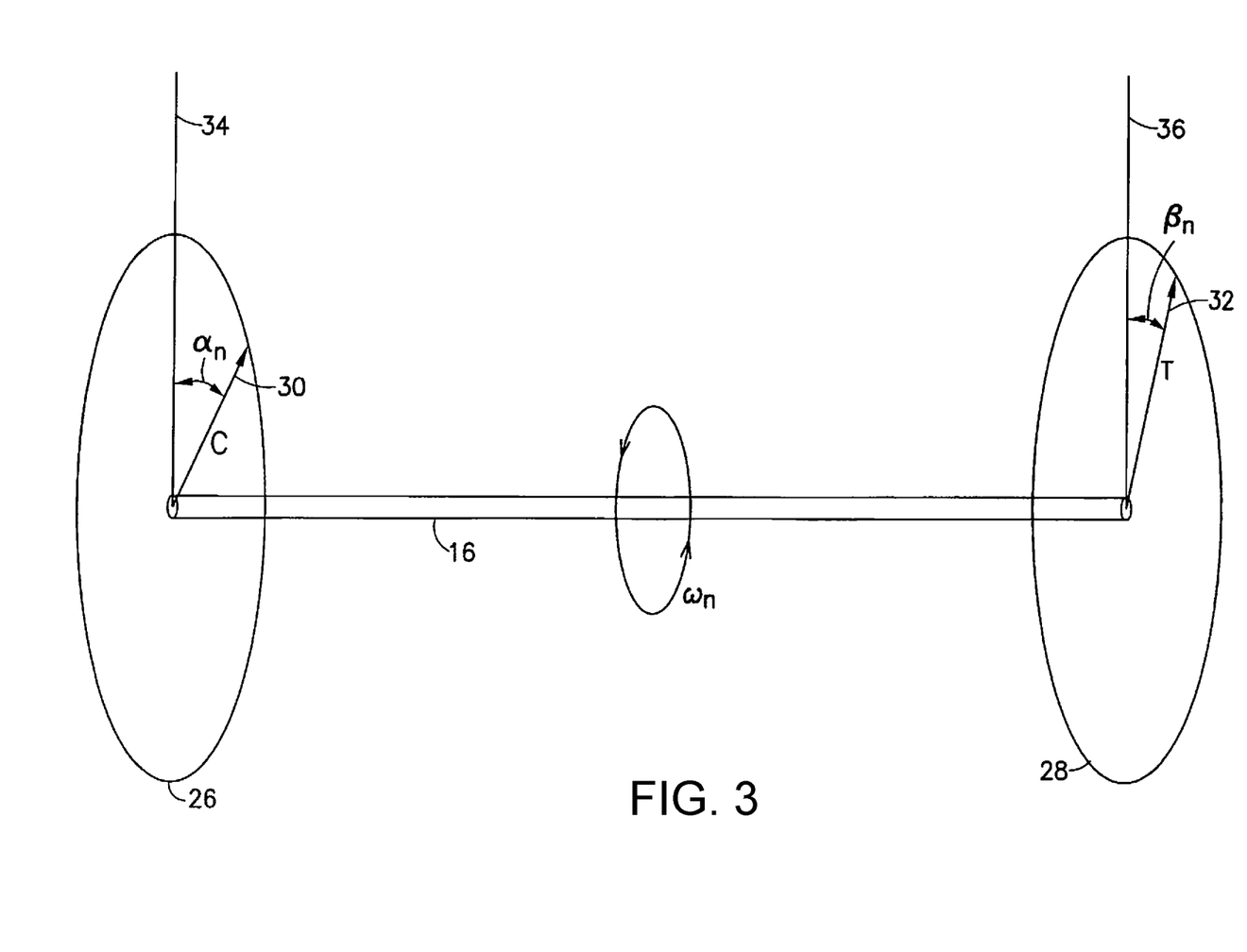
FIG. 3 is a vector diagram representing vibrations generated during rotation of the rotating components depicted in idealized form in FIG. 2.

FIG. 3 is a vector diagram depicting the forces exerted on a gas turbine engine due to vibrations of the compressor and turbine rotors. The shaft 16 is shown rotating at a speed $\omega_n$ between a forward unbalance plane 26 and an aft unbalance plane 28. The aft unbalance plane 28 corresponds to the location where a turbine rotor is located (toward the aft end of the engine) and where the vibration induced by the turbine rotor acts on the engine. For a particular instant in time, an unbalanced condition T of the turbine rotor is depicted as a vector 32. Likewise, the forward unbalance plane 26 corresponds to the location where a compressor rotor (or a fan) is located (toward the forward end of the engine) and where the vibration induced by the compressor rotor (or fan) acts on the engine. For the same particular instant in time, an unbalanced condition C of the compressor rotor is depicted as a vector 30.

The vector 30 has a magnitude and a phase angle $\alpha_n$ (relative to axis 34) at the engine rpm $\omega_n$. Similarly, the unbalanced displacement vector 32 has a magnitude and a phase angle $\beta_n$ (relative to axis 36) at the engine rpm $\omega_n$. The magnitudes and phase angles of vectors 30 and 32 can be determined using any suitable technique known in the art, for example, an influence coefficient method of balancing can be employed. The use of influence coefficients to balance aircraft engines is well known. These influence coefficients are arranged to form a sensitivity matrix that quantifies the change in vibration level at the engine vibration sensors due to a unit increase in unbalance level at unbalance source locations (e.g., at the fan).

In the case of a high-bypass turbofan engine, a known balancing method takes into account the effects of plane unbalances at the fan and the last stage of the low-pressure turbine, and other plane unbalances caused by stages that lack means for mounting balance weights. The as-built vibration at any location in an engine is at least in part due to such unbalances, although some stages typically affect the overall unbalance more than others. The influences of unbalances in all of the stages of the rotating system can be related to the accessible stages using influence coefficients, which can be derived from the vibrational responses when different balancing masses are installed and the system is operated. These vibrational responses are measured at various shaft speeds using sensor pickups (e.g., accelerometers). In practice, any engine that has unacceptably high unbalances after manufacture can be first run on the ground to measure its as-built vibration via sensor pickups. These measurements can be taken over the engine operating range of speeds (measured in rpm). Such data may be recorded when the engine is operating at a specific shaft speed. Measurements while the engine is on the ground do not take into account certain kinds of dynamic response now identified in aircraft engines. Such dynamic responses may be obtained from vibration data collected during a variety of conditions. In the case of aircraft engines, the majority of their service life will be spent in the air, rendering data taken only from test cell or ground conditions of limited value for achieving adequate balancing.

Influence coefficients determined for a particular location are representative of a response at a balancing plane or plane of interest. Influence coefficients may be expressed as a magnitude and a phase shift having units of displacement and angle per mass-length respectively. One set of magnitude units typically used is mils double amplitude per gram-centimeter. One known method of calculating influence coefficients for such planes or stages is to use measured data from a representative baseline engine ground run, and two trial runs, where data from each trial run is obtained from sensor pickups after placing trial masses on one or both balancing planes (e.g., fan and last stage of the low-pressure turbine). Trials may be conducted for the engine operating envelope. Thus, the influence coefficients can be calculated since the actual corrective masses added during any trial run are known, and the resultant change in vibration is also known because it can be measured at the sensor pickups.

In theory, the influence coefficients for a given engine, or from one engine to another of the same type or model, should be nearly identical. However, due to nonlinearity factors, manufacturing tolerances, measurement errors, wear, distortion over time, and other factors, it has been found that a single set of influence coefficients cannot be relied on. It is known in the prior art to implement a balancing method by a simple averaging of influence coefficients calculated for a number of engines, to obtain so-called generic influence coefficients usable for most engines with some level of confidence, or more exact influence coefficients can be calculated for each engine in the above-described manner. In accordance with a known balancing procedure, a history of an engine's characteristics, including predetermined influence coefficients for trim balancing, can be updated and stored for reference when performing the balancing procedure. These influence coefficients relate vibration data amplitude and phase at specific locations and shaft speeds to the mass unbalance at a reference position.

As previously noted, in order to determine balance solutions for the rotating systems of aircraft engines, vibration data is obtained. In the balancing methods disclosed herein, vibration data is gathered during flight and, optionally, from non-flight conditions. In accordance with one balancing method, the engine is operated for a period of time under different flight regimes such as take-off, climb, level-off, cruise, descent, idle descent, etc. Operation in the different flight regimes exposes the engine to different power settings, altitudes, ambient temperatures, fan blade movement, and so forth. Such varying operating parameters influence the engine vibration characteristics, resulting in variation which can be measured for the full range of dynamic responses of interest by acquiring vibration data. The operational envelope of an engine may include time at elevated power settings, thermal loading, altitude variation, changes to rotational inertia as well as the full engine operating range for different flight regimes. For example, vibration data may be acquired for each engine throughout an entire flight of the aircraft, including takeoff, climb, cruise, descent and landing. This method subjects the engine to different operating conditions. For a particular speed of interest, there is typically a different vibration or accelerometer response associated with each operating condition. Multiple responses or data points are acquired for each speed or speed range of interest. The multitude of responses is more representative of in-service use or subsequent flights. The multitude of responses can be used advantageously to determine and apply a balance solution. The applied balance solution may have advantages over balance solutions that are based on single response, from a single operating condition, for each speed or speed range of interest.

Figure 4:
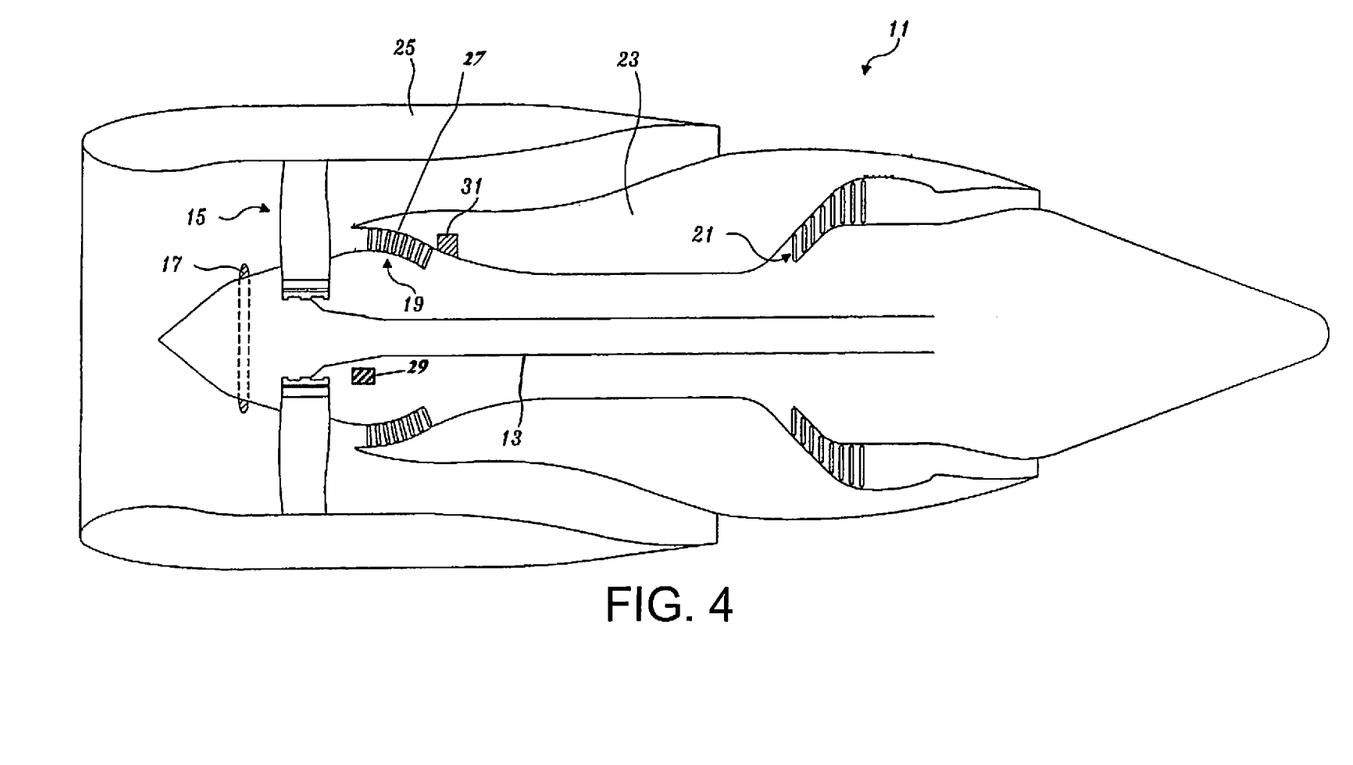
FIG. 4 is a is a side cut-away pictorial diagram of a typical high-bypass jet engine of the type used to power commercial aircraft.

Prior to describing one embodiment of an improved engine balancing method, a high-bypass jet engine of the type commonly used to power modern commercial aircraft will be briefly described. FIG. 4 is a side cut-away pictorial diagram of a typical high-bypass jet engine 11 of the type used to power commercial aircraft. The high-bypass jet engine 11 includes a low-speed rotating system comprising a low-speed shaft 13, a fan 15, a fan balance ring 17, a low-pressure compressor 19, and a low-pressure turbine 21. The engine 11 also includes a high-speed rotating system, which is not shown. Because the fan 15, fan balance ring 17, low-pressure compressor 19, and low-pressure turbine 21 are all connected to the low-speed shaft 13, all of these components rotate at the same speed as the low-speed shaft 13.

The fan balance ring 17 is disposed near the forwardmost portion of the low-speed shaft 13 and is affixed thereto. The fan balance ring 17 is circular and includes a plurality of holes (not shown) distributed at equal angular intervals near its circumference. The holes form receptacles for receiving balance weights. Thus, the function of the fan balance ring 17 is to receive balance weights that aid in balancing the low-speed rotating system of the engine 11.

The fan 15 of the engine 11 is disposed immediately behind the fan balance ring 17 and is comprised of a plurality of substantially identical blades that radiate outwardly from the low-speed shaft 13 at equal angular intervals. The individual blades that comprise the fan 15 are fixedly secured to the low-speed shaft 13. Disposed behind the fan 15 is the low-pressure compressor 19. The low-pressure compressor 19 consists of a plurality of compressor blades disposed adjacent one another and radially inwardly fixedly connected to the low-speed shaft 13 and radially outwardly contained within the fan frame compressor case 27. A first engine vibration sensor 31 is attached to the engine 11 at a first location (e.g., on the fan frame compressor case 27). A second engine vibration sensor 29 is attached to the engine 11 at a second location (e.g., on the forward-most bearing, also referred to herein as "Bearing No. 1", which bearing rotatably supports the forward end of the low-speed shaft 13). In some examples, the first and second engine vibration sensors are accelerometers.

An engine casing 23 of generally tubular shape is disposed circumferentially about the low-pressure shaft 13, extending from the low-pressure compressor 19 backward, past the low-pressure turbine 21. The engine casing 23 surrounds that portion of the engine that lies behind the fan 15. An engine nacelle 25 of generally tubular shape is disposed circumferentially about the fan 15 and a forward portion of the engine casing 23, extending from the fan 15 backward nearly to the point where the low-pressure turbine 21 is positioned. In some examples, the engine nacelle 25 may extend along some or the full length of the engine casing 23. Disposed at the forward portion of the engine casing 23 is a rotor speed sensor (not shown) that provides a signal indicative of the engine rpm of the low-speed shaft 13.

A method will now be described for balancing an engine of the type depicted in FIG. 4. The balancing method uses an artificial neural network and a global optimization algorithm configured as a loop in which: the global optimization algorithm inputs to the artificial neural network data representing proposed changes in the balance weight attached to the engine; the artificial neural network outputs data estimating changes in engine vibration in response to input of the data representing the proposed changes in balance weight; and the global optimization algorithm outputs an optimum influence coefficient calculated using a minimum predicted change in engine vibration. This process can be repeated multiple times to derive a multiplicity of optimum influence coefficients for various ranges of shaft speed (hereinafter "engine rpm") and altitude, which optimum influence coefficients are used to determine an optimal balance solution for the engine. The balance weights attached to the engine are then reconfigured in accordance with the optimal balance solution.

Figure 5:
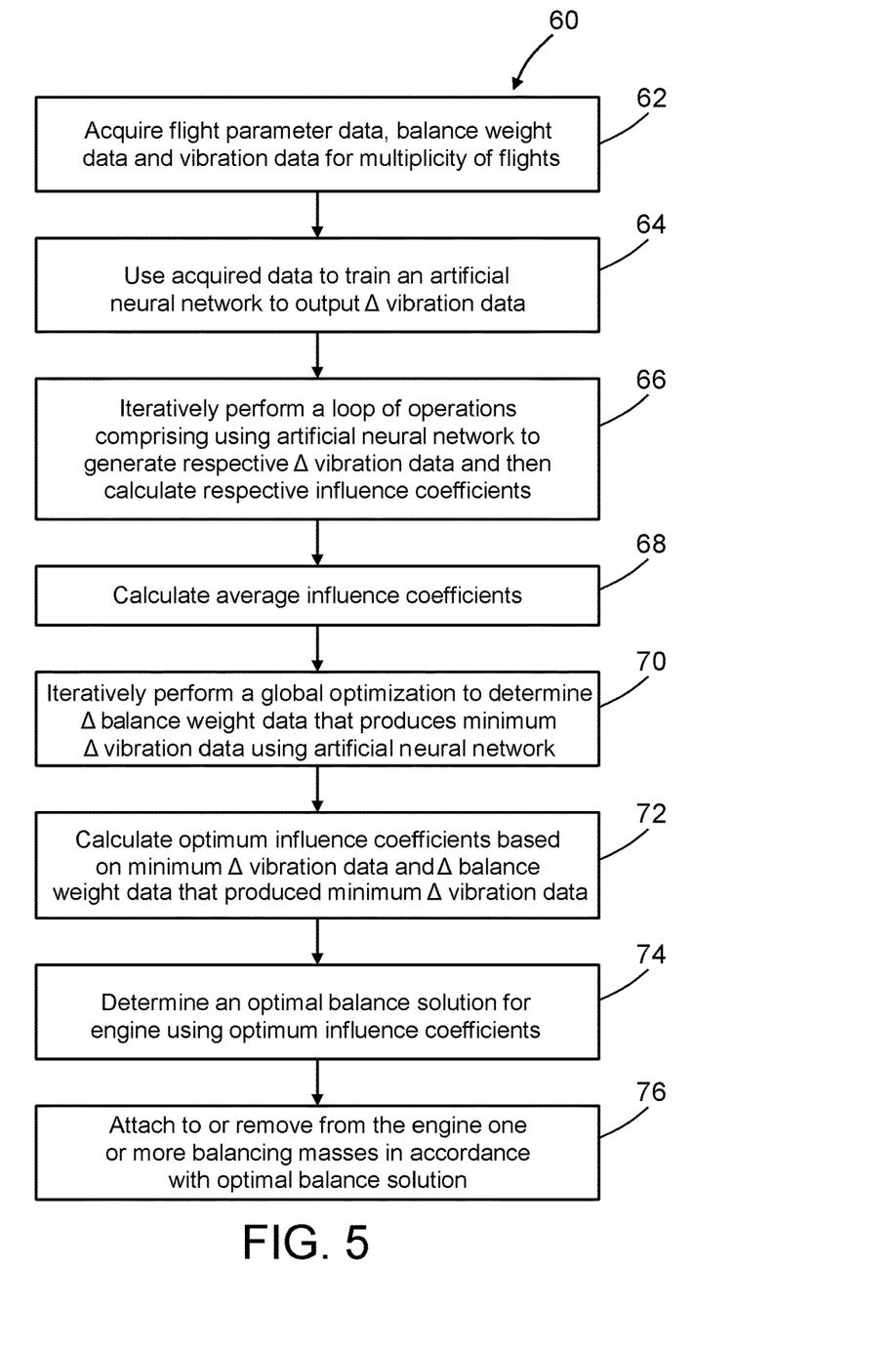
FIG. 5 is a flowchart identifying steps of a method for obtaining an optimal balance solution for the fan of a turbofan engine in accordance with one embodiment.

FIG. 5 is a flowchart identifying steps of a method 60 for obtaining an optimal balance solution for the fan of a turbofan engine in accordance with one embodiment. The first step 62 of this process involves the collection of flight parameter data, balance weight data and vibration data for a multiplicity of flights of the aircraft to which the turbofan engine is mounted. For example, during each flight, samples of vibration data are acquired from each vibration sensor. A data recorder, such as a digital flight data recorder or an airborne vibration monitor (AVM) box, receives vibration data samples (amplitude and phase) from each vibration sensor in the sensor set along with shaft speed data (also referred to herein as "engine rpm data") from a tachometer. The sensor outputs can take the form of variable voltage or other signals, which can be converted to amplitude and phase by the AVM box (or flight data recorder). The collected flight parameter data, balance weight data and vibration data is then stored in a non-transitory tangible computer-readable storage medium. That non-transitory tangible computer-readable storage medium is accessible by a data processing system either directly or indirectly by way of a database server. The data processing system may comprise a computer system configured with software for processing data in the manner disclosed herein.

Still referring to FIG. 5, the flight parameter data, balance weight data and vibration data collected (i.e., acquired) in step 62 are then used by the data processing system to train an artificial neural network (step 64). More specifically, the artificial neural network is trained to output $\Delta$ vibration data representing a predicted $\Delta$ vibration for an engine in response to input of flight parameter data for first and second flights of the aircraft and $\Delta$ balance weight data representing a $\Delta$ balance weight, wherein the predicted $\Delta$ vibration represents a difference in respective predicted engine vibrations and the $\Delta$ balance weight represents a difference in respective balance weight configurations (i.e., magnitude and phase angle) for the first and second flights.

More specifically, the artificial neural network is trained to establish a mapping or correlation between a multiplicity of inputs (e.g., N1% for the first and second flights of a pair of flights; Altitude, Mach Number, Temperature, and Thrust for the first flight; $\Delta$ Altitude, $\Delta$ Mach Number, $\Delta$ Temperature, and $\Delta$ Thrust corresponding to respective differences between Altitude, Mach Number, Temperature, and Thrust for the first and second flights; and $\Delta$ Balance Weight Real and $\Delta$ Balance Weight Imaginary corresponding to respective differences between the real and imaginary components of the respective balance weight configurations for the first and second flights) and an output (i.e., predicted $\Delta$ vibration corresponding to the difference between the predicted engine vibration for the second flight and the measured engine vibration for the first flight).

Artificial neural networks are generally known for their function approximation and pattern recognition performance. Various processes for training an artificial neural network are known. In brief, the artificial neural network may be trained by adjusting model parameters such that application of a set of inputs matches a desired set of outputs. Several differing artificial neural network approaches to the engine unbalance detection problem may be employed. For example, an approach known as back-propagation is the most common method used in the training of feed-forward artificial neural networks (also known as multilayer perception) with differentiable transfer functions to perform function approximation. For example, a typical multilayer perception (MLP) artificial neural network may comprise an input layer having a plurality of inputs, a first hidden layer including a plurality of nodes having respective nodal weights, and finally, an output layer including a plurality of outputs. In an alternative embodiment, the MLP artificial neural network comprises an input layer having a plurality of inputs, a first hidden layer including a first plurality of nodes having respective nodal weights, a second hidden layer including a second plurality of nodes having respective nodal weights, and finally, an output layer including a plurality of outputs.

Generally, training of artificial neural networks can be made more efficient if the data (both the network input and output) can be scaled beforehand. One approach for scaling network inputs and targets is to normalize the mean and standard deviation of the training set, which normalizes the inputs and targets so that they will have zero mean and unity standard deviation. If this preprocessing approach is employed for the training set data, then whenever the trained network is used with new inputs, such new inputs should be preprocessed with the same means and standard deviations that were computed for the training set. The outputs generated from these preprocessed inputs may also be converted back into the same units that were used for the original targets.

Referring again to FIG. 5, after the neural network has been trained, the data processing system iteratively performs a first loop of operations (step 66) which are configured to convert flight parameter data and balance weight data for a multiplicity of flights of the aircraft into a respective sets of influence coefficients for each engine rpm range/altitude range pairing. More specifically, respective sets of influence coefficients for each engine rpm range/altitude range pairing are calculated for the multiplicity of flights and stored in respective bins of a two-dimensional array in a non-transitory tangible computer-readable storage medium. One axis of the two-dimensional array of bins is engine rpm, while the other axis is altitude.

In accordance with one embodiment, the first loop of operations (step 66) comprises the following operations: First, the artificial neural network is used to generate predicted Δ vibration data representing respective predicted Δ vibrations for respective pairs of flights of the aircraft for engine rpm in each of a multiplicity of engine rpm ranges and for altitudes in each of a multiplicity of altitude ranges. Then a set of respective influence coefficients are calculated based on the respective predicted Δ vibration data and respective Δ balance weights for the respective pairs of flights (i.e., the first and second flights, the second and third flights, etc.). In each instance, the influence coefficient is calculated by dividing the balance weight for the first flight of the pair of flights by the particular predicted Δ vibration corresponding to the difference of the engine vibrations for the first and second flights of the pair of flights. Each set of influence coefficients being stored in a respective bin corresponding to a respective engine rpm range/altitude range pair (i.e., for each altitude range, the engine will have a respective set of engine rpm ranges).

After the sets of influence coefficients have been generated and stored, a respective statistical measure (e.g., an arithmetic mean or average) is calculated for each set of influence coefficients (step 68 in FIG. 5). Each statistical measure corresponds to a particular engine rpm range/altitude range pairing. For example, a respective average influence coefficient (derived from multiple flight pairings, e.g., first/second, second/third, etc.) is calculated for each engine rpm range and a particular altitude range, with similar sets of average influence coefficient being acquired for the same (or different) engine rpm ranges, but for different altitude ranges. The final result is a two-dimensional array of average influence coefficients, one axis of the two-dimensional array being engine rpm range and the other axis being altitude range. Optionally, these average influence coefficients can be used later (in conjunction with optimum influence coefficients calculated using the global optimization method described in more detail below) to compute an optimal balance solution.

The engine balancing methodology disclosed herein also iteratively performs a second loop of operations (step 70 in FIG. 5) comprising using the artificial neural network and a global optimization method to calculate optimum influence coefficients. The trained artificial neural network model is used to generate a new set of optimum influence coefficients by minimizing the predicted Δ vibrations for an engine of an aircraft based on empirical flight parameter data and hypothetical changes to Δ balance weight (which represents the difference between the balance weight used during a first flight and a hypothetical balance weight for proposed use during a modeled second flight).

In accordance with one embodiment, the predicted Δ vibrations are minimized by an iterative global optimization process during which the Δ balance weights input to the artificial neural network are changed. In response to the input of each different hypothetical Δ balance weight, the artificial neural network outputs a respective predicted Δ vibration. For each set of predicted Δ vibrations, the global optimization method determines which predicted Δ vibration in the set is the minimum for that set. That minimum predicted Δ vibration can be divided by the balance weight for the first flight to calculate a respective optimum influence coefficient for each combination of engine rpm range and altitude range for that engine (step 72 in FIG. 5). This set of optimum influence coefficients is then input to the balancing software. The balancing software is configured to find a balance solution for that engine using the optimum influence coefficients (step 74), either with or without taking the average influence coefficients into account. The engine is then balanced by attaching to or removing from the engine one or more balance weights each having a respective mass and a respective location in accordance with the optimal balance solution (step 76).

In the present context, which particular influence coefficients (i.e., optimum without average or both optimum with average influence coefficients) are selected for use will, among other factors, be a function of the engine shaft speed and which plane of unbalance needs to be balanced. For example, for a particular engine model, respective influence coefficients can be provided corresponding to respective engine rpm (i.e., shaft speed) ranges. For each vibration data point acquired while the engine shaft speed was in a particular speed range, the respective influence coefficients will be those associated with that particular speed range or an interpolation of such influence coefficients. Influence coefficients may be expressed in vector form. An unbalance state may be determined based on a vector product of a vibration data point and a respective influence coefficient. The unbalance state can also be represented by a vector, the tip location of which can be plotted in polar coordinates.

In accordance with some embodiments of the enhanced engine balancing methodology disclosed herein, an optimal engine balance solution is obtained using a hybrid optimization technique comprising local and global optimization algorithms of the types disclosed in U.S. Pat. No. 9,347,321, the disclosure of which is incorporated by reference herein in its entirety.

In accordance with one embodiment of a hybrid optimization technique, flight parameter data and optimum sensitivity data (i.e., optimum influence coefficients) are used to obtain an optimum fan solution using two vibration sensors (e.g., accelerometers) located on the forwardmost bearing of the low-speed shaft and on the fan frame compressor case. As used herein, the term "fan solution" means the weight to be added to the fan balance ring using balance weights. These weights are added by screwing them into screw hole locations around the perimeter of the fan balance ring. The fan solution represents the mass and the location of the weight to be added. This is a resultant balance weight vector and existing codes could be used to partition this vector into several balance weights based on the available weight sizes, angular installation positions, and limits on the number of weights desired. The algorithms used to determine the resultant balance weight vector, or fan solution, are described in detail U.S. Pat. No. 9,347,321.

The flight parameter data, balance weight data and optimum influence coefficients are read into a computer which is programmed to apply multiple optimization methods concurrently to obtain an optimal fan solution that minimizes vibrations of both sensors. This fan solution may then be implemented by adding one or more balancing weights, which weights are expected to minimize the vibrations at the forwardmost bearing (hereinafter "Bearing No. 1 sensor") and on the fan frame compressor case (hereinafter "FFCC sensor"). This fan solution may optionally be validated analytically and/or by flight test. The predicted vibrations can be computed using the following equation:

$$Vib\_predicted = Vib\_flight + [\text{Influence Coefficients}] * [\text{Balancing Weights}]$$

Typically, the units of the influence coefficients are [mils DA]/[gm-cm]. The predicted vibrations at the Bearing No. 1 and FFCC sensors are computed using separate equations since they each have their own unique set of initial vibrations from the previous testing and a unique set of sensitivities to change in fan balance weight. The optimization method does not discriminate between the vibration data from the Bearing No. 1 and FFCC sensors when the objective is set to minimize the maximum vibrations across both sensors, which is the typical desired use case. This means that each optimization method considers vibrations at both sensors to be equally important with no preference given to one or the other.

This hybrid optimization method is flexible with regard to how the objective function is defined and has the capability to balance based on one engine vibration sensor only (i.e., either the Bearing No. 1 sensor 29 or the FFCC sensor 31 seen in FIG. 4) or both engine vibration sensors, which is a typical desired use case. In alternative embodiments, the vibration data obtained during flight testing may include vibration data from both the Bearing No. 1 and FFCC sensors and/or any other sensors used as ride comfort indicators, such as cabin microphones, seat accelerations, etc.

The optimization setup disclosed above is flexible and has balancing options including: balancing at the fan only or at both the fan and the low-pressure turbine; minimizing one or more engine and other airplane responses indicative of ride comfort, such as cabin microphones and seat accelerations; biasing the balance solution toward one engine speed: and user-specified speed and altitude ranges for balancing.

Figure 6:
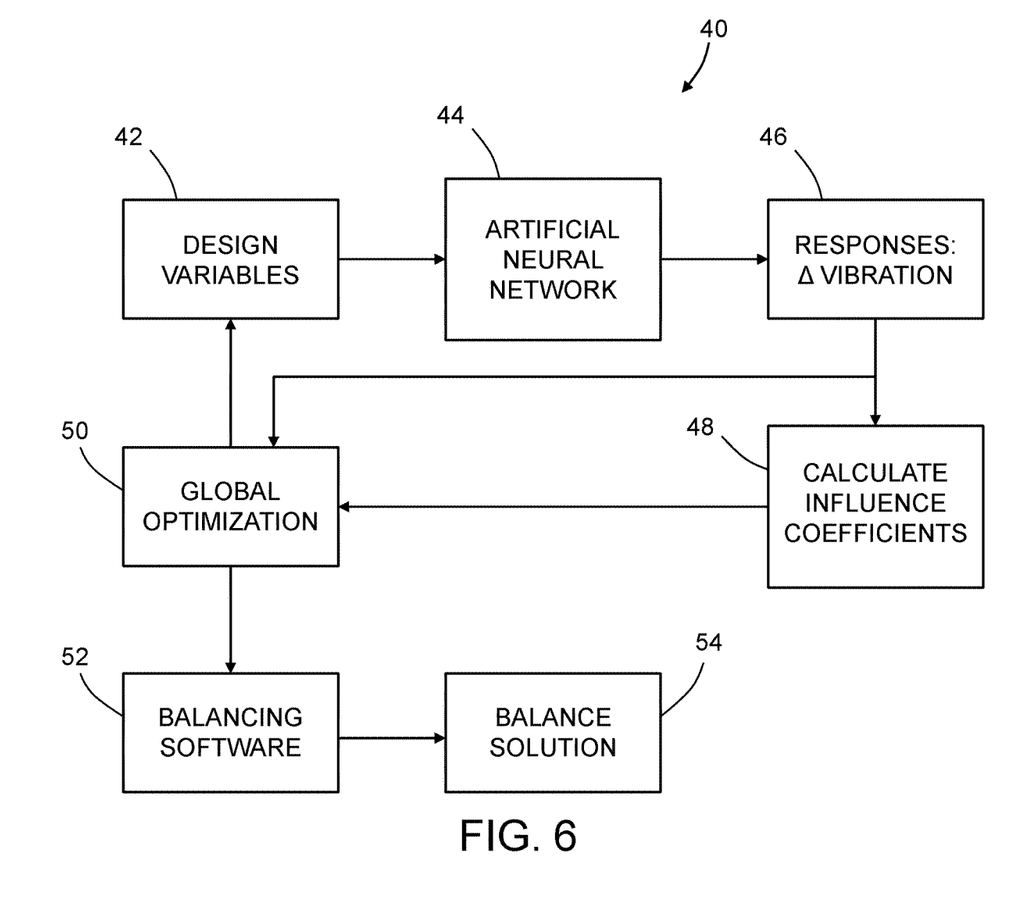
FIG. 6 is a flowchart identifying steps of a method for calculating a set of optimum influence coefficients which are used by balancing software to obtain an optimal balance solution for the fan of a turbofan engine in accordance with one embodiment.

FIG. 6 is a flowchart identifying steps of a method 40 for calculating a set of optimum influence coefficients which are used by balancing software 52 to obtain an optimal balance solution 54 for the fan of a turbofan engine. This method 40 involves a loop of operations that produces the optimum influence coefficients. More specifically, the loop comprises an artificial neural network 44, an influence coefficient calculation algorithm 48 for calculating influence coefficients, and a global optimization method 50 (e.g., a genetic algorithm). As previously described, the trained artificial neural network 44 receives a set of design variables 42 (including hypothetical changes Δ balance weights) selected by the global optimization method 50 and responds by outputting predicted Δ vibrations 46. The influence coefficient calculation algorithm 48 calculates a respective influence coefficient based on the inputs to and outputs from artificial neural network 44 for each changed Δ balance weight and based on the equation set forth in the next paragraph. The global optimization method 50 generates the hypothetical changed Δ balance weights, receives the predicted Δ vibrations from the artificial neural network 44 and, for each engine rpm/altitude pairing, determines which of the calculated influence coefficients is the optimum influence coefficient corresponding to the minimum predicted Δ vibration. That minimum predicted Δ vibration can be divided by the balance weight for the first flight to calculate a respective optimum influence coefficient for each combination of engine rpm range and altitude range for that engine. This set of optimum influence coefficients is output to the balancing software 52 which determines the optimal balance solution 54.

Some of the above-described method steps (e.g., steps 68 and 72 in FIG. 5) use the following fundamental engine balancing equation (all quantities are in complex form):

$$\overline{V}_{F2} = \overline{V}_{F1} + A\overline{u}$$

The individual variables appearing in this equation are explained in the following table, which also includes matrix and vector dimensions, wherein $n_w$ is the number of engine rpms at which the engine is tested, $n_s$ is the number of engine sensors recording vibrations, and $n_b$ is the number of engine balancing planes:

| Variable | Description (in context of engine balancing optimization) | Dimensions |
| --- | --- | --- |
| $\overline{V}_{F2}$ | Residual engine vibration vector for the second flight (i.e., F2). | $(n_w \times n_s)$ rows × 1 column |
| $\overline{V}_{F1}$ | Baseline engine vibration vector for the first flight (i.e., F1). | $(n_w \times n_s)$ rows × 1 column |
| A | Influence Coefficient (Sensitivity) Matrix. This represents how much the vibration will change at each sensor when a unit balance weight is added at each balance plane. | $(n_w \times n_s)$ rows × $n_b$ columns |
| $\overline{u}$ | Balance weight vector for the first flight. | $n_b$ rows × 1 column |

The balancing method disclosed herein can be used to determine where and how many balancing masses should be added to an engine or can be used to determine how existing balancing masses are to be adjusted, for example, by adding mass, by moving one or more attached masses to different locations, or by removing one or more attached masses and substituting one or more different masses at the same or different locations.

The above-described balancing methodology can be used to minimize engine vibrations across multiple vibration sensors. In the case of an airplane, this reduction in engine vibration results in decreased transmitted cabin noise and vibration levels along with decreased (cyclical) stress in the support structures. Thus, this balancing method provides an aircraft which operates more quietly and which is subject to less fatigue. Therefore, sound insulation and structural weight may be reduced. The disclosed balancing method also eliminates the cost associated with re-working aircraft engines and verification re-flights.

While various embodiments have been described, it will be understood by those skilled in the art that various changes may be made and equivalents may be substituted for elements thereof without departing from the scope of the teachings herein. For example, suitable algorithms other than those disclosed in U.S. Pat. No. 9,347,321 can be used. In addition, many modifications may be made to adapt a particular situation to those teachings without departing from the scope thereof. Therefore it is intended that scope of the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., non-transitory tangible computer-readable storage medium) for storing a program which is readable by the processing unit.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for balancing an unbalanced gas turbine aircraft engine, comprising:
    (a) acquiring flight parameter data, balance weight data and vibration data for a multiplicity of flights of an aircraft having a gas turbine engine that is unbalanced;
    (b) using the flight parameter data, balance weight data and vibration data to train an artificial neural network to output difference ($\Delta$) vibration data representing a predicted $\Delta$ vibration for the gas turbine engine for first and second flights of the aircraft in response to input of flight parameter data for the first and second flights and difference ($\Delta$) balance weight data representing a $\Delta$ balance weight, wherein the predicted $\Delta$ vibration corresponds to a difference between a predicted engine vibration for the second flight and a measured engine vibration for the first flight, while the $\Delta$ balance weight corresponds to a difference between the respective balance weights for the first and second flights;
    (c) iteratively performing a loop of operations comprising using the artificial neural network and a global optimization method to calculate a first optimum influence coefficient, wherein the global optimization method determines a first minimum predicted $\Delta$ vibration output by the artificial neural network for modeled flights having various changed $\Delta$ balance weights, wherein the first minimum predicted $\Delta$ vibration is for engine revolutions per minute (rpm) in a first engine rpm range and for altitudes in a first altitude range;
    (d) determining an optimal balance solution for the gas turbine engine using the first optimum influence coefficient calculated in step (c); and
    (e) balancing the gas turbine engine by attaching to or removing from the gas turbine engine one or more balance weights each having a respective mass and a respective location in accordance with the optimal balance solution;
    wherein in step (b) the artificial neural network is trained to output $\Delta$ vibration data representing a difference in amplitude and a difference in phase of predicted vibrations in the gas turbine engine during the first and second flights of the aircraft in response to input of flight parameter data and $\Delta$ balance weight data for the first and second flights;
    wherein the flight parameter data comprises data representing engine rpm, altitude, Mach number, temperature and thrust for the first and second flights, and the $\Delta$ balance weight data represents real and imaginary components of the $\Delta$ balance weight for the first and second flights; and
    wherein the global optimization method comprises:
    inputting to the artificial neural network $\Delta$ balance weight data representing various changed $\Delta$ balance weights; and
    determining the first minimum predicted $\Delta$ vibration in the gas turbine engine based on the $\Delta$ vibration data that is output from the artificial neural network in response to inputting to the artificial neural network of $\Delta$ balance weight data representing various changed $\Delta$ balance weights.

2. A method for balancing an unbalanced gas turbine aircraft engine, comprising:
    (a) acquiring flight parameter data, balance weight data and vibration data for a multiplicity of flights of an aircraft having a gas turbine engine that is unbalanced;
    (b) using the flight parameter data, balance weight data and vibration data to train an artificial neural network to output difference ($\Delta$) vibration data representing a predicted $\Delta$ vibration for the gas turbine engine for first and second flights of the aircraft in response to input of flight parameter data for the first and second flights and difference ($\Delta$) balance weight data representing a $\Delta$ balance weight, wherein the predicted $\Delta$ vibration corresponds to a difference between a predicted engine vibration for the second flight and a measured engine vibration for the first flight, while the $\Delta$ balance weight corresponds to a difference between the respective balance weights for the first and second flights;
    (c) iteratively performing a loop of operations comprising using the artificial neural network and a global optimization method to calculate a first optimum influence coefficient, wherein the global optimization method determines a first minimum predicted $\Delta$ vibration output by the artificial neural network for modeled flights having various changed $\Delta$ balance weights, wherein the first minimum predicted $\Delta$ vibration is for engine revolutions per minute (rpm) in a first engine rpm range and for altitudes in a first altitude range;
    (d) determining an optimal balance solution for the gas turbine engine using the first optimum influence coefficient calculated in step (c); and
    (e) balancing the gas turbine engine by attaching to or removing from the gas turbine engine one or more balance weights each having a respective mass and a respective location in accordance with the optimal balance solution,
    wherein the first optimum influence coefficient is calculated by dividing a modeled $\Delta$ balance weight that resulted in the first minimum predicted $\Delta$ vibration by the first minimum predicted $\Delta$ vibration.

3. A method for balancing an unbalanced gas turbine aircraft engine, comprising:
    (a) acquiring flight parameter data, balance weight data and vibration data for a multiplicity of flights of an aircraft having a gas turbine engine that is unbalanced;
    (b) using the flight parameter data, balance weight data and vibration data to train an artificial neural network to output difference ($\Delta$) vibration data representing a predicted Δ vibration for the gas turbine engine for first and second flights of the aircraft in response to input of flight parameter data for the first and second flights and difference (Δ) balance weight data representing a Δ balance weight, wherein the predicted Δ vibration corresponds to a difference between a predicted engine vibration for the second flight and a measured engine vibration for the first flight, while the Δ balance weight corresponds to a difference between the respective balance weights for the first and second flights;

(c) iteratively performing a loop of operations comprising using the artificial neural network and a global optimization method to calculate a first optimum influence coefficient, wherein the global optimization method determines a first minimum predicted Δ vibration output by the artificial neural network for modeled flights having various changed Δ balance weights, wherein the first minimum predicted Δ vibration is for engine revolutions per minute (rpm) in a first engine rpm range and for altitudes in a first altitude range;

(d) determining an optimal balance solution for the gas turbine engine using the first optimum influence coefficient calculated in step (c);

(e) balancing the gas turbine engine by attaching to or removing from the gas turbine engine one or more balance weights each having a respective mass and a respective location in accordance with the optimal balance solution;

(f) iteratively performing a loop of operations comprising using the artificial neural network to generate predicted Δ vibration data representing respective predicted Δ vibrations for respective pairs of flights of the aircraft for engine rpm in the first engine rpm range and altitudes in the first altitude range, and then calculating a set of respective influence coefficients based on the respective predicted Δ vibration data and respective Δ balance weights for the respective pairs of flights; and (g) calculating a statistical measure for the set of influence coefficients calculated in step (f).

4. The method as recited in claim 3, wherein the statistical measure is an arithmetic mean.

5. The method as recited in claim 4, wherein step (d) also uses the statistical measure of the set of influence coefficients calculated in step (f) to determine the optimal balance solution.

6. A method for balancing an unbalanced gas turbine aircraft engine, comprising:
(a) acquiring flight parameter data, balance weight data and vibration data for a multiplicity of flights of an aircraft having a gas turbine engine that is unbalanced;
(b) using the flight parameter data, balance weight data and vibration data to train an artificial neural network to output Δ vibration data representing a predicted Δ vibration for the gas turbine engine for first and second flights in response to input of flight parameter data for the first and second flights and Δ balance weight data representing a Δ balance weight, wherein the predicted Δ vibration corresponds to a difference between a predicted engine vibration for the second flight and a measured engine vibration for the first flight, while the Δ balance weight corresponds to a difference between the respective balance weights for the first and second flights;
(c) iteratively performing a loop of operations comprising using the artificial neural network and a global optimization method to calculate a first optimum influence coefficient, wherein the global optimization method determines a first minimum predicted Δ vibration output by the artificial neural network for modeled flights having various changed Δ balance weights, wherein the first minimum predicted Δ vibration is for engine rpm in a first engine rpm range and for altitudes in a first altitude range;
(d) calculating a second optimum influence coefficient using the artificial neural network and the global optimization method, wherein the global optimization method determines a second minimum predicted Δ vibration output by the artificial neural network for modeled flights having various changed Δ balance weights, wherein the second minimum predicted Δ vibration is for engine rpm in a second engine rpm range different than the first engine rpm range and for altitudes in the first altitude range;
(e) calculating a third optimum influence coefficient using the artificial neural network and the global optimization method, wherein the global optimization method determines a third minimum predicted Δ vibration output by the artificial neural network for modeled flights having various changed Δ balance weights, wherein the third minimum predicted Δ vibration is for engine rpm in the first engine rpm range and for altitudes in a second altitude range different than the first altitude range;
(f) determining an optimal balance solution for the gas turbine engine using the first, second and third optimum influence coefficients calculated in steps (c) through (e); and
(g) balancing the gas turbine engine by attaching to or removing from the gas turbine engine one or more balance weights each having a respective mass and a respective location in accordance with the optimal balance solution.

7. The method as recited in claim 6, wherein the global optimization method comprises a genetic algorithm.

8. The method as recited in claim 6, wherein in step (b) the artificial neural network is trained to output Δ vibration data representing a difference in amplitude and a difference in phase of predicted vibrations in the gas turbine engine during the first and second flights of the aircraft in response to input of flight parameter data and Δ balance weight data for the first and second flights of the aircraft.

9. The method as recited in claim 8, wherein the flight parameter data comprises data representing engine rpm, altitude, Mach number, temperature and thrust for the first and second flights, and the Δ balance weight data represents real and imaginary components of the Δ balance weight for the first and second flights.

10. The method as recited in claim 9, wherein the global optimization method comprises:
inputting to the artificial neural network Δ balance weight data representing various changed Δ balance weights; and
determining the minimum predicted Δ vibration in the gas turbine engine based on the Δ vibration data that is output from the artificial neural network in response to inputting to the artificial neural network of Δ balance weight data representing various changed Δ balance weights.

11. A gas turbine aircraft engine comprising a fan spinner and one or more balance weights attached to the fan spinner, wherein the mass and location of each balance weight was determined using a method comprising the following steps:

(a) acquiring flight parameter data, balance weight data and vibration data for a multiplicity of flights of an aircraft to which the gas turbine aircraft engine is mounted;

(b) using the flight parameter data, balance weight data and vibration data to train an artificial neural network to output Δ vibration data representing a predicted Δ vibration for the gas turbine aircraft engine for first and second flights in response to input of flight parameter data for the first and second flights of the aircraft and Δ balance weight data representing a Δ balance weight, wherein the predicted Δ vibration corresponds to a difference between a predicted engine vibration for the second flight and a measured engine vibration for the first flight, while the Δ balance weight corresponds to a difference between the respective balance weights for the first and second flights;

(c) iteratively performing a loop of operations comprising using the artificial neural network and a global optimization method to calculate a first optimum influence coefficient, wherein the global optimization method determines a minimum predicted Δ vibration output by the artificial neural network for modeled flights having various changed Δ balance weights, wherein the minimum predicted Δ vibration is for engine rpm in an engine rpm range and for altitudes in an altitude range; and (d) determining an optimal balance solution for the gas turbine aircraft engine using the optimum influence coefficient calculated in step (c), wherein the optimal balance solution specifies the respective mass and respective location of each balance weight.

12. The gas turbine aircraft engine as recited in claim 11, wherein in step (b) the artificial neural network is trained to output Δ vibration data representing a difference in amplitude and a difference in phase of predicted vibrations in the gas turbine aircraft engine during the first and second flights of the aircraft in response to input of flight parameter data and Δ balance weight data for the first and second flights of the aircraft.

13. The gas turbine aircraft engine as recited in claim 12, wherein the flight parameter data comprises data representing engine rpm, altitude, Mach number, temperature and thrust for the first and second flights, and the Δ balance weight data represents real and imaginary components of the Δ balance weight for the first and second flights.

14. The gas turbine aircraft engine as recited in claim 13, wherein the global optimization method comprises:

inputting to the artificial neural network Δ balance weight data representing various changed Δ balance weights; and determining the minimum predicted Δ vibration in the gas turbine aircraft engine based on the Δ vibration data that is output from the artificial neural network in response to input to the artificial neural network of the Δ balance weight data representing various changed Δ balance weights.

* * * * *